US009477887B2

(12) United States Patent
Kawaguchi et al.

(10) Patent No.: US 9,477,887 B2
(45) Date of Patent: Oct. 25, 2016

(54) APPARATUS AND METHOD FOR ANALYZING TRAJECTORY

(71) Applicant: Panasonic Corporation, Osaka (JP)

(72) Inventors: Kyoko Kawaguchi, Tokyo (JP); Taiki Sekii, Ishikawa (JP); Masamoto Tanabiki, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/675,878

(22) Filed: Apr. 1, 2015

(65) Prior Publication Data

US 2015/0286866 A1    Oct. 8, 2015

(30) Foreign Application Priority Data

Apr. 7, 2014    (JP) .................. 2014-078580

(51) Int. Cl.
*G06K 9/00*    (2006.01)
*G06K 9/46*    (2006.01)
*G06T 7/20*    (2006.01)

(52) U.S. Cl.
CPC ......... *G06K 9/00624* (2013.01); *G06K 9/4604* (2013.01); *G06T 7/208* (2013.01); *G06T 7/2033* (2013.01); *G06T 2207/10016* (2013.01); *G06T 2207/10024* (2013.01); *G06T 2207/20076* (2013.01); *G06T 2207/20101* (2013.01); *G06T 2207/30196* (2013.01); *G06T 2207/30221* (2013.01); *G06T 2207/30241* (2013.01)

(58) Field of Classification Search
USPC ....................................................... 382/103
See application file for complete search history.

(56) References Cited

U.S. PATENT DOCUMENTS

| 5,680,862 | A | * | 10/1997 | Song ........................ G06T 7/20 324/307 |
| 2005/0046699 | A1 | * | 3/2005 | Oya .................. G08B 13/19602 348/207.1 |
| 2008/0240497 | A1 |   | 10/2008 | Porikli et al. |
| 2008/0285806 | A1 | * | 11/2008 | Kokaram .............. G06T 7/2006 382/107 |

FOREIGN PATENT DOCUMENTS

JP    2008-243187    10/2008

OTHER PUBLICATIONS

The Extended European Search Report dated Sep. 4, 2015 for the related European Patent Application No. 15161617.4.

(Continued)

*Primary Examiner* — Alex Liew
(74) *Attorney, Agent, or Firm* — McDermott Will & Emery LLP

(57) ABSTRACT

A trajectory analyzing apparatus includes a matching unit that calculates the correlation between a forward trajectory obtained by tracking a moving object over pictures along the forward direction of the time axis and a backward trajectory obtained by tracking a moving object over the pictures along the backward direction of the time axis and a result output unit that outputs trajectory information indicating at least one of the forward trajectory, the backward trajectory, and an integrated trajectory obtained by integrating the forward trajectory and backward trajectory and indicating the degree of reliability of the at least one trajectory based on the calculated correlation.

16 Claims, 13 Drawing Sheets

(56) References Cited

OTHER PUBLICATIONS

Tom Caljon et al: "An Offline Bidirectional Tracking Scheme", Jan. 1, 2005, Advanced Concepts for Intelligent Vision Systems Lecture Notes in Computer Science LNCS, Springer, Berlin, DE, pp. 587-594.

Son Tran et al: "UMD_VDT, an Integration of Detection and Tracking Methods for Multiple Human Tracking", May 8, 2007, Multimodal Technologies for Perception of Humans; Lecture Notes in Computer Science, Springer, Berlin, Heidelberg, pp. 179-190.

Qiang Zhu et al "Fast human detection using a cascade of histograms of oriented gradients" IEEE Computer Society Conference on Computer Vision and Pattern Recognition, 2006.

Katja. Nummiaro et al. "An Adaptive Color-Based Particle Filter" Image and Vision Computing, vol. 21, 2003, p. 99-110.

* cited by examiner

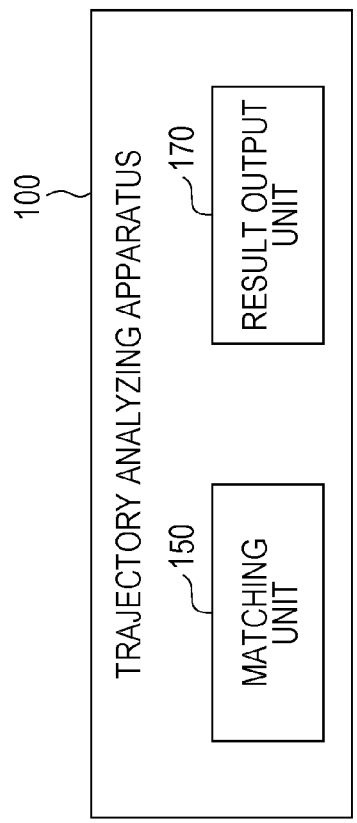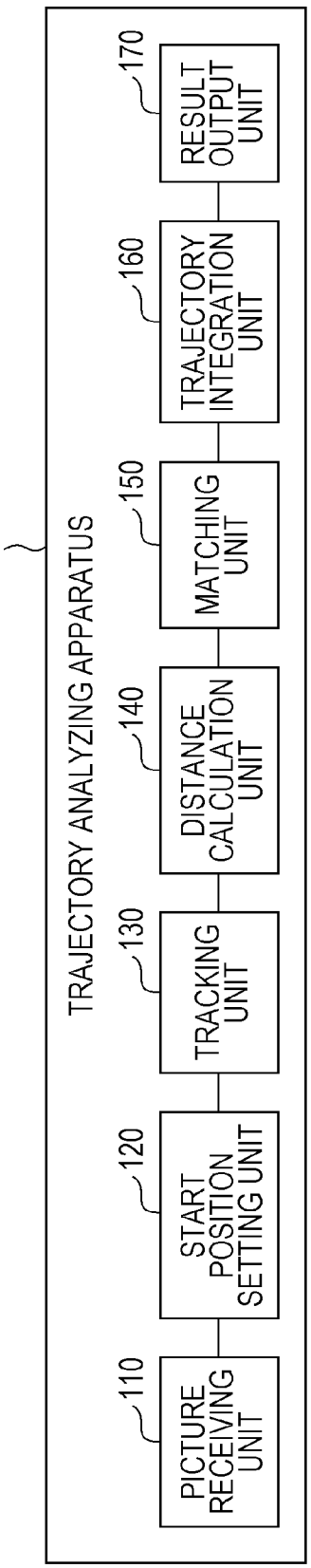

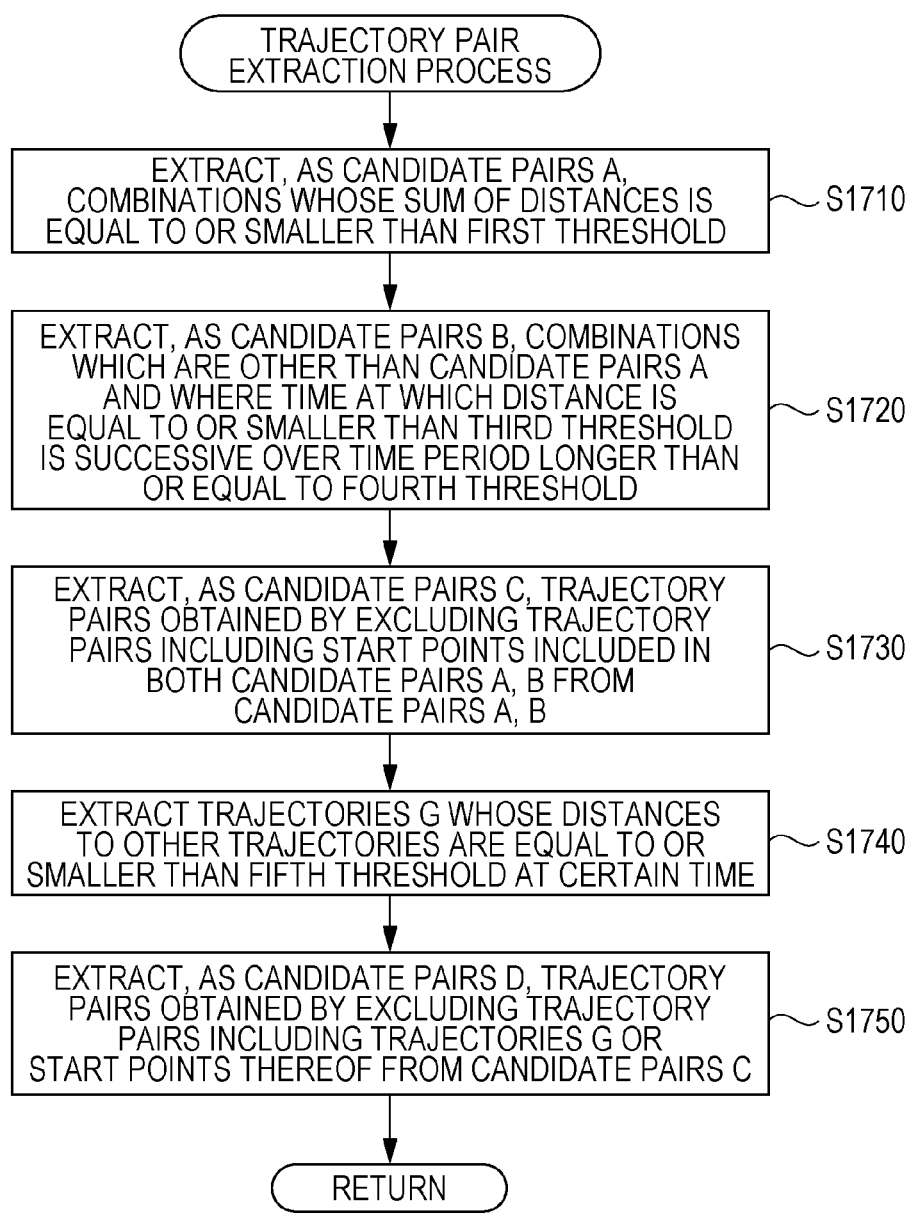

APPARATUS AND METHOD FOR ANALYZING TRAJECTORY

BACKGROUND

1. Technical Field

The present disclosure relates to a computer vision and in particular to a trajectory analyzing apparatus and method that analyze a result obtained by tracking a moving object over pictures.

2. Description of the Related Art

A process of tracking the movement of a moving object over pictures by extracting the moving object from time-series frames forming the pictures (hereafter referred to as the "moving-object tracking process") have been utilized in various fields in recent years.

In the moving-object tracking process, typically, the image features and position of a moving object extracted from the preceding and earlier frames are used to search for the moving object in the subsequent frame. Such a moving-object tracking process allows for tracking of the moving object with high accuracy; however, this process causes accumulation of errors and tends to reduce the tracking accuracy as the moving object moves away from the start point of the trajectory thereof.

In view of the foregoing, there have been developed technologies of improving the tracking accuracy by tracking a moving object from the first picture along the forward direction of the time axis and tracking a moving object from the last picture along the backward direction of the time axis. One example of such technologies is Japanese Unexamined Patent Application Publication No. 2008-243187.

A technology disclosed in Japanese Unexamined Patent Application Publication No. 2008-243187 (hereafter referred to as the "related art") selects one of multiple moving-object tracking algorithms and tracks a moving object along both the forward and backward directions of the time axis. If there is a large difference between the obtained forward and backward trajectories, the related art changes the moving-object tracking algorithm to another to perform a moving-object tracking process again.

This related art is less likely to accumulate errors of the tracking accuracy, that is, allows for use of a moving-object tracking algorithm which is more suitable for the moving object to be tracked (hereafter referred to as the "target moving object") and thus allows for improvements in tracking accuracy.

SUMMARY

However, even when the moving-object tracking algorithm is changed to another, the tracking accuracy may not reach a predetermined level. For example, for a moving object which moves very fast or freely or moving object which largely changes in appearance, the tracking accuracy is difficult to improve.

One non-limiting exemplary embodiment provides a trajectory analyzing apparatus and method which can output information having high significance as a result of a moving-object tracking process even when the tracking accuracy is low.

In one general aspect, the techniques disclosed here feature: a trajectory analyzing apparatus includes a matching unit that calculates a correlation between a forward trajectory obtained by tracking a moving object over pictures along a forward direction of a time axis and a backward trajectory obtained by tracking a moving object over the pictures along a backward direction of the time axis and a result output unit that outputs trajectory information indicating at least one of the forward trajectory, the backward trajectory, and an integrated trajectory obtained by integrating the forward trajectory and backward trajectory and indicating the degrees of reliability of the at least one trajectory based on the calculated correlation.

According to the present disclosure, information having high significance can be outputted as a result of a moving-object tracking process even when the tracking accuracy is low.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 shows the configuration of a trajectory analyzing apparatus according to a first embodiment of the present disclosure;

FIG. 2 shows an example of the configuration of a trajectory analyzing apparatus according to a second embodiment of the present disclosure;

FIG. 7 shows an example of details of a pair extraction process according to the second embodiment;

DETAILED DESCRIPTION

Figure 3:
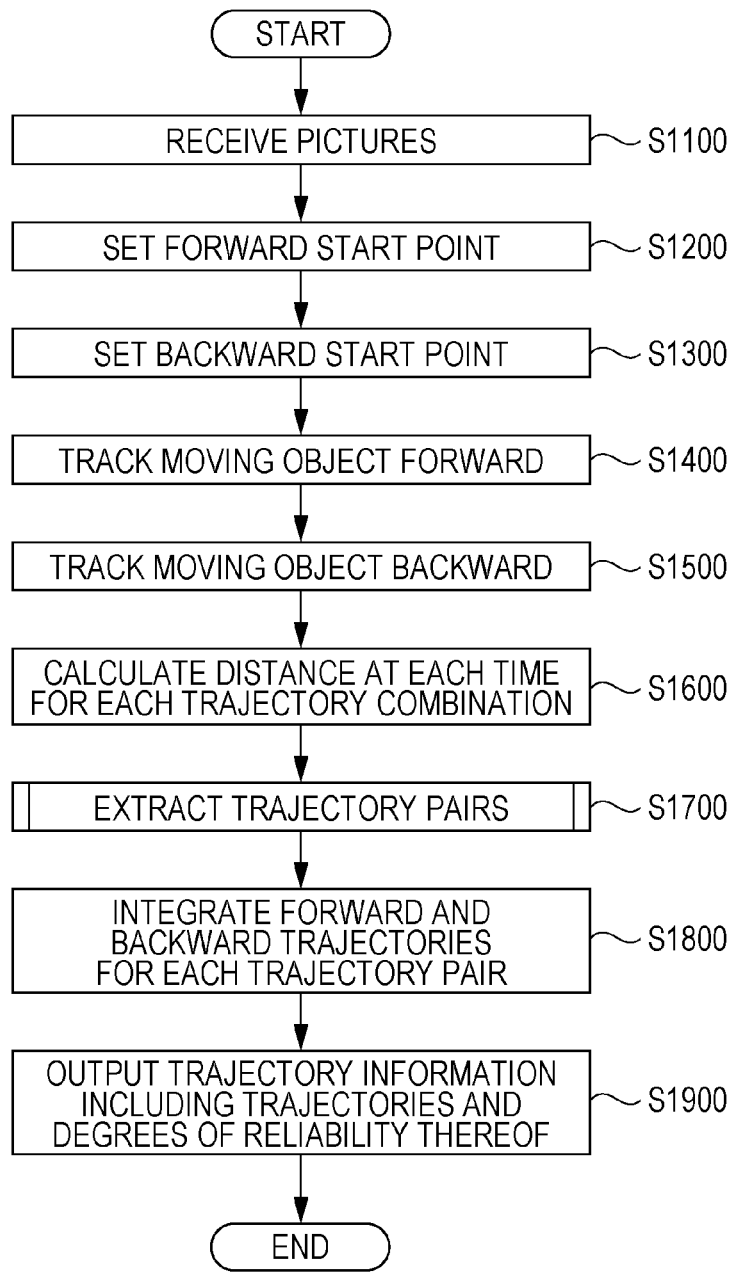
FIG. 3 shows an example of the operation of the trajectory analyzing apparatus according to the second embodiment.

The above related art cannot output any trajectory of the moving object when the tracking accuracy does not reach the predetermined level or can output only information indicating the probability of a trajectory obtained by tracking the moving object along one direction of the time axis. That is, when the tracking accuracy is low, the related art cannot output information having high significance as the result of the moving-object tracking process. In view of the foregoing, the present disclosure provides a trajectory analyzing apparatus and method which can output information having high significance as a result of a moving-object tracking process even when the tracking accuracy is low.

Now, embodiments of the present disclosure will be described in detail with reference to the accompanying drawings.

First Embodiment

A first embodiment of the present disclosure is an example of the basic aspect of the present disclosure.

FIG. 1 is a block diagram showing the configuration of a trajectory analyzing apparatus according to the present embodiment.

In FIG. 1, a trajectory analyzing apparatus 100 includes a matching unit 150 and a result output unit 170.

The matching unit 150 calculates the correlation between a forward trajectory obtained by tracking a moving object over pictures along the forward direction of the time axis and a backward trajectory obtained by tracking a moving object over the pictures along the backward direction of the time axis.

The result output unit 170 outputs trajectory information indicating at least one of the forward trajectory, the backward trajectory, and an integrated trajectory obtained by integrating these trajectories and indicating the reliability of the at least one trajectory based on the calculated correlation.

Although not shown, the trajectory analyzing apparatus 100 also includes, for example, a central processing unit (CPU), a storage medium storing a control program, such as read only memory (ROM), and a working memory, such as random access memory (RAM). The functions of the elements described above are implemented when the CPU executes the control program.

The trajectory analyzing apparatus 100 thus configured can output information having high significance, that is, a trajectory and the reliability thereof as a result of a moving-object tracking process even when the tracking accuracy is low.

Second Embodiment

A second embodiment of the present disclosure is one specific aspect of an apparatus which analyzes results obtained by tracking multiple moving objects and to which the present disclosure is applied.

Configuration of Trajectory Analyzing Apparatus

FIG. 2 is a block diagram showing an example of the configuration of a trajectory analyzing apparatus according to the present embodiment.

In FIG. 2, the trajectory analyzing apparatus 100 includes a picture receiving unit 110, a start position setting unit 120, a tracking unit 130, a distance calculation unit 140, a matching unit 150, a trajectory integration unit 160, and a result output unit 170.

The picture receiving unit 110 receives a predetermined length of picture data including time-series frames (hereafter simply referred to as "pictures"). The picture receiving unit 110 may receive pictures directly from a digital camera, may read pictures from a storage medium, or may receive pictures from a server on a network. The picture receiving unit 110 may also include a digital camera. The picture receiving unit 110 outputs the received pictures to the start position setting unit 120.

The start position setting unit 120 sets, to the received pictures, a forward start point representing the start position of a forward trajectory and a backward start point representing the start position of a backward trajectory. The forward start point and backward start point may be set by performing image analysis on the first frame and last frame (hereafter referred to as the "top frame" and "end frame," respectively) on the time axis or may be set based on a user operation. The start position setting unit 120 outputs the received pictures and information indicating the set forward start point and backward start point to the tracking unit 130.

As used herein, the forward trajectory refers to a result obtained by tracking a moving object (the "moving-object tracking process" will be discussed later) over the pictures along the forward direction of the time axis. The forward start point refers to the position of the target moving object in the top frame.

The backward trajectory refers to a result obtained by tracking a moving object over the pictures along the backward direction of the time axis. The backward start point refers to the position of the target moving object in the end frame.

If multiple moving objects are included in the pictures, multiple forward start points and multiple backward start points can be set. The set forward start point and backward start point are not necessarily those of the same moving object.

The tracking unit 130 generates a forward trajectory by tracking a moving object over the received pictures from the forward start point indicated by the received information along the forward direction of the time axis. That is, the tracking unit 130 tracks the moving object located at the forward start point in the top frame along the forward direction of the time axis (hereafter referred to as "forward tracking"). The tracking unit 130 also generates a backward trajectory by tracking a moving object over the received pictures from the backward start point indicated by the received information along the backward direction of the time axis. That is, the tracking unit 130 tracks the moving object located at the backward start point in the end frame along the backward direction of the time axis (hereafter referred to as "backward tracking"). The tracking unit 130 then outputs information indicating the generated forward trajectory and backward trajectory to the distance calculation unit 140.

If multiple forward start points are set, multiple forward trajectories are generated; if multiple backward start points are set, multiple backward trajectories are generated.

The distance calculation unit 140 calculates, with respect to the combination of the forward trajectory and backward trajectory indicated by the received information (hereafter referred to as the "trajectory combination"), the distance between the trajectories (hereafter simply referred to as the "distance") at each time on the time axis of the pictures (i.e., the time axis of the forward trajectory and backward trajectory). If at least one of the forward trajectory and backward trajectory includes multiple trajectories, the distance is calculated with respect to all possible combinations with the multiple trajectories. The distance calculation unit 140 then outputs information indicating the trajectory combination and the distances thereof at the respective times to the matching unit 150.

The matching unit 150 calculates the correlation between the forward trajectory and backward trajectory of the trajectory combination on the basis of the received information. As used herein, the correlation refers to the probability that the trajectory combination may be the forward trajectory and backward trajectory of the same moving object and is an index value which is higher as both trajectories are closer to each other at the respective times on the time axis. A method for calculating a correlation will be described in detail later.

If at least one of the forward trajectory and backward trajectory includes multiple trajectories, the matching unit 150 determines a pair of forward trajectory and backward trajectory which are more likely to have been generated with respect to the same moving object (hereafter referred to as "trajectory pair"), on the basis of the correlations. Note that if there are one forward trajectory and one backward trajectory, the matching unit 150 may determine the forward trajectory and backward trajectory as a trajectory pair. A method for determining a trajectory pair will be described in detail later.

The matching unit 150 outputs information indicating the trajectory combinations, the calculated correlations thereof, and the determined trajectory pair to the trajectory integration unit 160.

The trajectory integration unit 160 generates an integrated trajectory by integrating the forward trajectory and backward trajectory included in the trajectory pair indicated by the received information. A method for integrating the trajectories will be described in detail later. The trajectory integration unit 160 then outputs information indicating the trajectory combinations, the correlations thereof, the trajectory pair, and the generated integrated trajectory to the result output unit 170.

The result output unit 170 outputs, based on the received information, trajectory information indicating at least one of the forward trajectory, backward trajectory, and integrated trajectory (hereafter collectively referred to as the "trajectories" as appropriate) and indicating the reliability of the at least one trajectory based on the correlation. More specifically, the result output unit 170 outputs an image representing the at least one trajectory as trajectory information. If there are multiple trajectory combinations, an image generated as trajectory information (hereafter referred to as a "trajectory display image") is displayed in such a manner that the differences in reliability among the multiple trajectories are shown in the form of the differences in display form among the trajectories. For example, the result output unit 170 outputs the generated trajectory display image to a display device such as a liquid crystal display or projector so that the image is displayed on the display device, or converts the image into a file and stores it in a storage medium such as a hard disk.

Although not shown, the trajectory analyzing apparatus 100 also includes, for example, a CPU, a storage medium storing a control program, such as ROM, and a working memory, such as RAM. The functions of the elements described above are implemented when the CPU executes the control program.

The trajectory analyzing apparatus 100 thus configured can convert trajectory information including the trajectories and the degrees of reliability thereof into an image and display it.

If the tracking accuracy is low, even when the same moving object is tracked over the pictures, forward and backward trajectories thereof are not necessarily generated in such a manner that the difference therebetween is sufficiently small. That is, less reliable trajectories can be generated. On the other hand, by outputting trajectories, as well as the degrees of reliability thereof, processes or work corresponding to the trajectories can be performed considering the degrees of reliability. For example, by displaying the trajectories in such a manner that the trajectories are superimposed on the pictures and thus the degrees of reliability are recognized, the operator can compare and consider the degrees of reliability and thus it is possible to reduce the trajectory check work performed by the operator.

That is, the trajectory analyzing apparatus 100 can output information having high significance as a result of the moving-object tracking process even when the tracking accuracy is low.

<Operation of Trajectory Analyzing Apparatus>

Next, the operation of the trajectory analyzing apparatus 100 will be described.

FIG. 3 is a flowchart showing an example of the operation of the trajectory analyzing apparatus 100. The trajectory analyzing apparatus 100 starts the following process, for example, when the user specifies the target pictures by operating an input device (not shown) such as a mouse or keyboard and instructs the apparatus to start tracking a moving object.

In step S1100, the picture receiving unit receives the pictures. The pictures received are, for example, pictures of a soccer game continuously captured for several seconds to several minutes. The target moving object is, for example, a soccer player(s).

In step S1200, the start position setting unit 120 sets the forward start point of each of the one or more target moving objects.

For example, the start position setting unit 120 displays the top frame on a display device (not shown) such as a liquid crystal display and receives the specification of the forward start point from the user via the input device. For another example, the start position setting unit 120 detects a human region from the top frame through a human region detection process and determines the representative point of this region as a forward start point. The representative point may be, for example, the center of the waist, the center of the head, or the barycenter of a rectangle or circle circumscribed by the region. The human region detection process may be, for example, a process which uses an identifier using a histograms of oriented gradients (HoG) feature value, described in Q. Zhu, M.-C. Yeh, K.-T. Cheng, and S. Avidan, "Fast human detection using a cascade of histograms of oriented gradients," IEEE Computer Society Conference on Computer Vision and Pattern Recognition, 2006, vol. 2, p. 1491-1498.

Information $Ps_i$ indicating the forward start point of the i-th moving object set to the top frame is, for example, three-dimensional data represented by $(id_i, x_i, y_i)$. As used herein, $id_i$ is the identifier of the i-th moving object whose forward start point is set and is also the identifier of a forward trajectory generated with respect to this moving object. Also, $x_i$ and $y_i$ represent the position of the i-th moving object and, for example, represent an x coordinate value and y coordinate value in the top frame in an xy coordinate system set in the pictures (hereafter referred to as the "picture coordinate system").

In step S1300, as with the forward start point, the start position setting unit 120 sets the backward start point of each moving object, for example, by displaying the end frame.

Information $Pe_j$ indicating the backward start point of the j-th moving object set to the end frame is, for example, three-dimensional data represented by $(id_j, x_j, y_j)$. As used herein, $id_j$ is the identifier of the j-th moving object whose backward start point is set and is also the identifier of a backward trajectory generated with respect to this moving object. Also, $x_j$ and $y_j$ represent the position of the j-th moving object and, for example, represent an x coordinate value and y coordinate value in the end frame in the picture coordinate system.

In step S1400, the tracking unit 130 generates forward trajectories by tracking each moving object in the forward direction on the basis of the information $Ps_i$ indicating the forward start point of the moving object.

The method for tracking a moving object may be, for example, a method described in Japanese Unexamined Patent Application Publication No. 2008-243187 or K. Nummiaro, E. Koller-Meier, L. Van Gool, "An Adaptive Color-Based Particle Filter," Image and Vision Computing, 2003, vol. 21, No. 1, p. 99-110. For example, the tracking unit 130 extracts the color feature value of a predetermined oval region centered on the start point in the top frame. The tracking unit 130 then calculates a region having a predetermined shape (e.g., ellipse or rectangle) which has the most similar feature value near the start point in the subsequent frame and determines the center of the calculated region as the position of the moving object in this frame. The color feature value may be, for example, a vector which uses RGB color information and consists of 8×8×8=512 dimensions.

The trajectory $Pf_{i,t}$ of the i-th moving object is, for example, time-series three-dimensional data represented by $(t, x_i, y_i)$. As used herein, t represents a time on the time axis of the pictures.

In step S1500, the tracking unit 130 generates backward trajectories by tracking each moving object in the backward direction on the basis of the information $Pe_i$ indicating the backward start point of the moving object. The method for tracking a moving object may be, for example, the method disclosed in Japanese Unexamined Patent Application Publication No. 2008-243187.

The trajectory $Pf_{j,t}$ of the j-th moving object at time t is, for example, time-series three-dimensional data represented by $(t, x_j, y_j)$.

Note that the same moving-object tracking algorithm need not necessarily be used in both the forward tracking in step S1400 and the backward tracking in step S1500 or in tracking multiple moving objects.

Figure 4A:
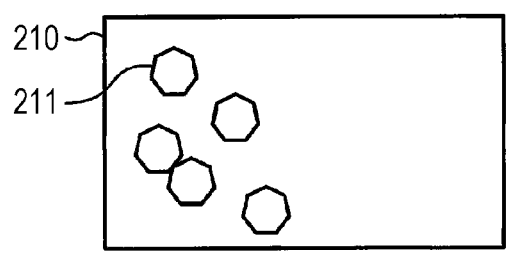
FIGS. 4A to 4C show an example of the manner in which a forward trajectory is acquired according to the second embodiment.
Figure 4B:
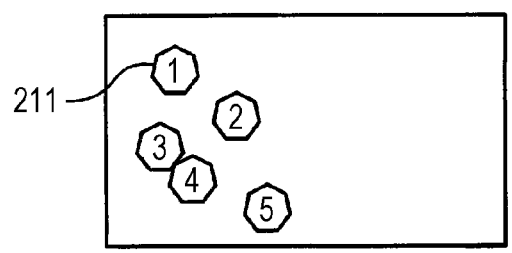
Figure 4C:
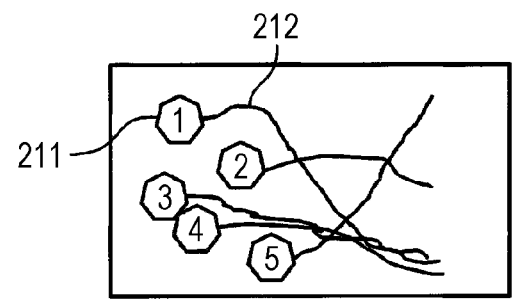
Figure 5A:
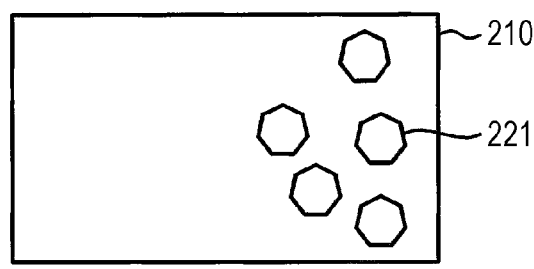
FIGS. 5A to 5C show an example of the manner in which a backward trajectory is acquired according to the second embodiment.
Figure 5B:
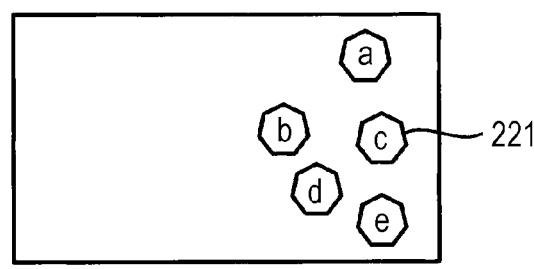
Figure 5C:
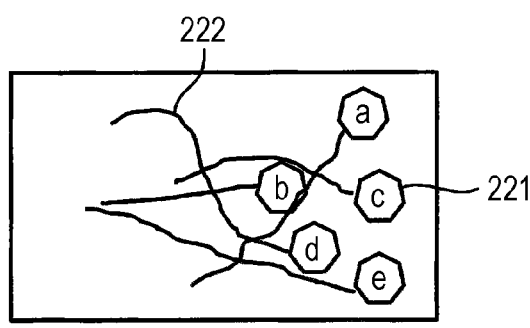

FIGS. 4A to 4C are diagrams showing an example of the manner in which a forward trajectory is acquired and correspond to steps S1100, S1200, and S1400 in FIG. 3. FIGS. 5A to 5C are diagrams showing an example of the manner in which a backward tracking is acquired and correspond to steps S1100, S1300, and S1500 in FIG. 3.

As shown in FIG. 4A, a top frame 210 includes five moving objects 211. It is assumed that forward start points are set in the representative positions of the moving objects 211. Then, as shown in FIG. 4B, integers 1 to 5, for example, are set to the five moving objects 211 as the identifiers $id_i$ of the forward start points. Then, as shown in FIG. 4C, forward trajectories 212 of the moving objects 211 are generated.

In the description below, a forward start point set to a moving object $211_i$ having an identifier $id_i$ "1" is referred to as a "start point 1," and a forward trajectory drawn from the start point 1 is referred to as a "trajectory 1," as appropriate. Similarly, forward start points and forward trajectories set to moving objects having identifiers $id_i$ "2" to $id_i$ "5" are referred to as "start points 2 to 5" and "trajectories 2 to 5," respectively.

As shown in FIG. 5A, an end frame 220 includes five moving objects 221. It is assumed that backward start points are set in the representative positions of the moving objects 221. Then, as shown in FIG. 5B, alphabets a to e, for example, are set to the five moving objects 221 as the identifiers $id_j$ of the backward start points. Then, as shown in FIG. 5C, backward trajectories 222 of the moving objects 221 are generated.

In the initial state, it is unknown which of the moving objects 211 included in the top frame 210 corresponds to which of the moving objects 221 of the end frame 220. That is, the identifier $id_i$ of a forward start point and the identifier $id_j$ of a backward start point are independent of each other.

In the description below, a backward start point set to a moving object $211_j$ having an identifier $id_j$ "a" is referred to as a "start point a," and a backward trajectory drawn from the start point a is referred to as a "trajectory a," as appropriate. Similarly, the backward start points and backward trajectories set to moving objects having identifiers $id_j$ "b" to $id_j$ "e" are referred to as "start points to b to e" and "trajectories b to e," respectively.

The trajectories 1 to 5, which are forward trajectories, and the trajectories a to e, which are backward trajectories, do not necessarily match each other with high accuracy. That is, there can be differences between the forward trajectories and backward trajectories, like the difference between FIG. 4C and FIG. 5C.

In step S1600 of FIG. 3, the distance calculation unit 140 calculates the distance at each time for each trajectory combination.

Since there are five forward trajectories and five backward trajectories in the above example, there are 25 trajectory combinations. If the number of times at which the distance is calculated (e.g., the number of frames) is, for example, 100, the number of distances to be calculated is 2500.

Figure 6A:
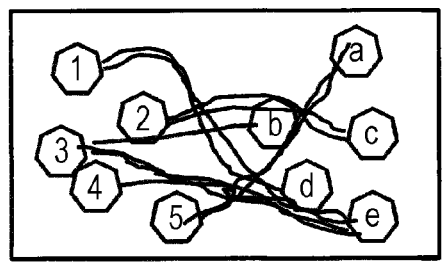
FIGS. 6A to 6C show the distances between trajectories according to the second embodiment.
Figure 6B:
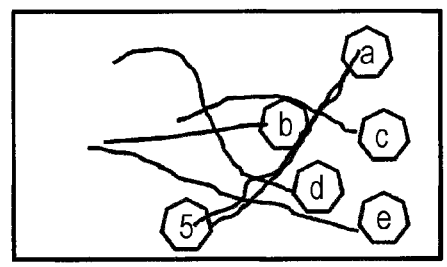
Figure 6C:
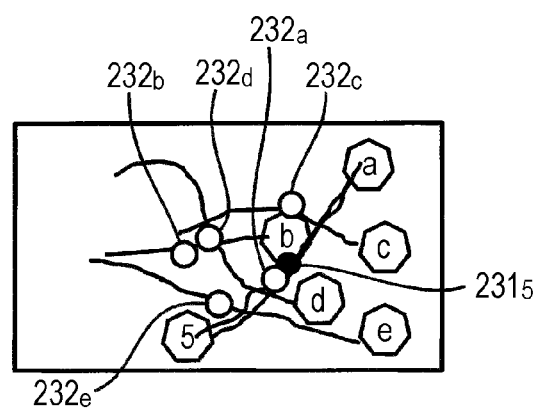

FIGS. 6A to 6C are diagrams showing the distance between trajectories.

FIG. 6A shows a result obtained by stacking the trajectories 1 to 5 (see FIG. 4C) and trajectories a to e (see FIG. 5C). FIG. 6B shows a result obtained by extracting only the trajectory 5 and trajectories a to e.

In FIG. 6C, the position of the trajectory 5 at a certain time t is $231_5$ shown by a black circle. The positions of the trajectories a to e at the same time t are positions $232_a$ to $232_e$ shown by white circles. The distance calculation unit 140 calculates the distances between the position $231_5$ and the positions $232_a$ to $232_e$.

In the example of FIG. 6C, the distance between the position $231_5$ on the trajectory 5 and the position $232_a$ on the trajectory a is the shortest of the calculated distances. The distance between the position $231_5$ on the trajectory 5 and the position $232_b$ on the trajectory b is the longest thereof. Accordingly, if the distance at the above time t is noted, the trajectory a is most likely to be the backward trajectory of the moving object having the trajectory 5, and the trajectory b is least likely to be such a backward trajectory.

In step S1700 of FIG. 3, the matching unit 150 extracts trajectory pairs. In the trajectory pair extraction process, trajectory pairs are extracted while considering the distance of each trajectory combination over all the pictures, and the correlation between trajectories forming each pair is calculated.

FIG. 7 is a flowchart showing an example of details of the pair extraction process of step S1700 in FIG. 3. FIGS. 8A to 10D are diagrams showing a pair extraction process and an example of extracted candidate pairs.

In the description below, it is assumed that pairs are extracted from the forward trajectories 1 to 5 and backward trajectories a to e shown in FIG. 6A.

In step S1710, the matching unit 150 extracts, as candidate pairs A (first pairs), one or more trajectory combinations whose sum of distances over all the pictures is equal to or smaller than a first threshold. The candidate pairs A are trajectory combinations whose trajectories resemble each other over all the pictures.

Alternatively, the matching unit 150 may extract, as candidate pairs A (first pairs), one or more trajectory combinations whose sum of distances over all the pictures is equal to or smaller than the first threshold and whose longest distance over all the pictures is equal to or smaller than a second threshold. Thus, candidate pairs deemed to be appropriate can be efficiently narrowed down.

Figure 8A:
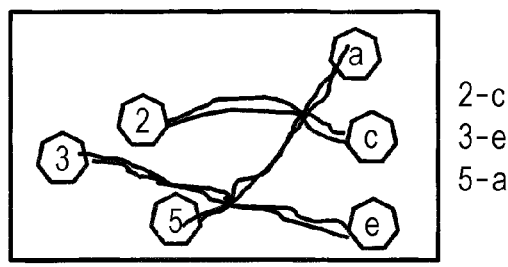
FIGS. 8A to 8C show a candidate pair extraction process and an example of extracted candidate pairs according to the second embodiment.

For example, as shown in FIG. 8A, the combination of the trajectories 2 and c (hereafter referred to as a "trajectory pair 2-c"), the combination of the trajectories 3 and e (hereafter referred to as a "trajectory pair 3-e"), and the combination of the trajectories 5 and a (hereafter referred to as a "trajectory pair 5-a") are extracted as candidate pairs A.

In step S1720 of FIG. 7, the matching unit 150 extracts, as candidate pairs B (second pairs), one or more trajectory combinations which are other than the candidate pairs A and where the time (frame) at which the distance is equal to or smaller than a third threshold is successive over a time period longer than or equal to a fourth threshold (the number of frames or the number of pieces of distance data). The candidate pairs B are trajectory combinations whose trajectories resemble each other not over all the pictures but over a relatively long time period.

Figure 8B:
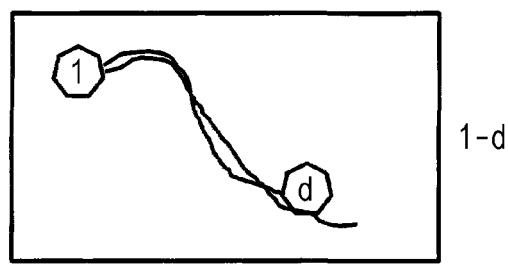
Figure 8C:
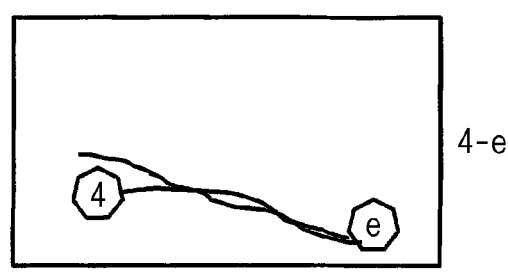

For example, as shown in FIGS. 8B and 8C, the combination of the trajectories 1 and d (hereafter referred to as a "trajectory pair 1-d") and the combination of the trajectories 4 and e (hereafter referred to as a "trajectory pair 4-e") are extracted as candidate pairs B.

In step S1730 of FIG. 7, the matching unit 150 determines whether among the forward start points and backward start points of the trajectories forming the candidate pairs A (hereafter collectively referred to as the "start points" as appropriate) and the start points of the trajectories forming the candidate pairs B are start points included in both the candidate pairs A and B. If there are such start points, the matching unit 150 extracts the start points and extracts, as candidate pairs C, one or more trajectory pairs obtained by excluding trajectory pairs including the extracted start points from the candidate pairs A and B. Alternatively, the matching unit 150 may determine whether among the forward trajectories and backward trajectories forming the candidate pairs A (hereafter collectively referred to as the "trajectories" as appropriate) and the trajectories forming the candidate pairs B are trajectories included in both the candidate pairs A and B. If there are such trajectories, the matching unit 150 extracts the trajectories and extracts, as candidate pairs C, one or more trajectory pairs obtained by excluding trajectory pairs including the extracted trajectories from the candidate pairs A and B. That is, the matching unit 150 excludes trajectory pairs formed by the trajectories included in both the candidate pairs A and B from the candidate pairs A and B and extracts the remaining trajectory pairs as candidate pairs C.

Of the trajectories forming the candidate pairs A and B, trajectories whose start points (or trajectories) overlap each other are more likely to have been obtained by erroneously tracking another moving object while tracking one moving object. Accordingly, the candidate pairs C are trajectory pairs where replacement of the target moving object (tracking of a wrong moving object) is less likely to have occurred.

Figure 9A:
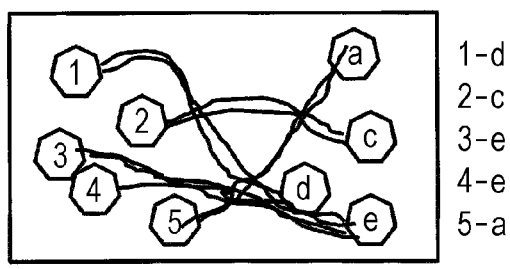
FIGS. 9A and 9B show a candidate pair extraction process and an example of extracted candidate pairs according to the second embodiment.
Figure 9B:
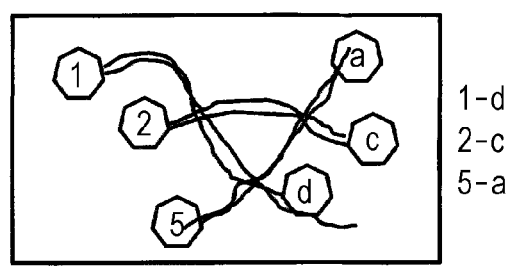

For example, as shown in FIG. 9A, the trajectory pairs 1-d, 2-c, 3-e, 4-e, and 5-a are candidate pairs A or B. In contrast to FIGS. 8A to 8C, the backward start point e (or trajectory e) is included in both the candidate pairs A and B. Accordingly, as shown in FIG. 9B, the trajectory pairs 1-d, 2-c, and 5-a, obtained by excluding the trajectory pairs 3-e and 4-e from the candidate pairs A and B shown in FIG. 9A are determined as candidate pairs C.

In step S1740 of FIG. 7, the matching unit 150 determines whether among the multiple forward trajectories or multiple backward trajectories are trajectories whose distances to other trajectories are equal to or shorter than a fifth threshold at a certain time over all the pictures. If there are such trajectories, the matching unit 150 extracts them as trajectories G. Of trajectories of multiple moving objects which have come close to each other at the certain time, the trajectories G are trajectories where change of the target moving object (erroneous tracking) is more likely to have occurred at such a time.

In step S1750, the matching unit 150 extracts, as candidate pairs D, one or more trajectory pairs obtained by excluding trajectory pairs including the trajectories G (or the start points of the trajectories G) from the candidate pairs C and returns to the process of FIG. 3. The candidate pairs D are trajectory pairs where erroneous tracking (change) of the target moving object is less likely to have occurred.

Figure 10A:
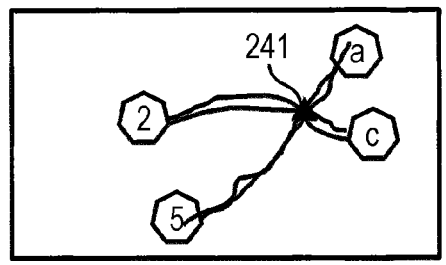
FIGS. 10A to 10D show a candidate pair extraction process and an example of extracted candidate pairs according to the second embodiment.
Figure 10B:
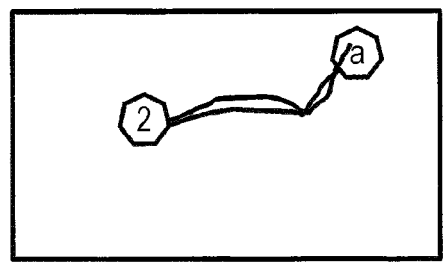
Figure 10C:
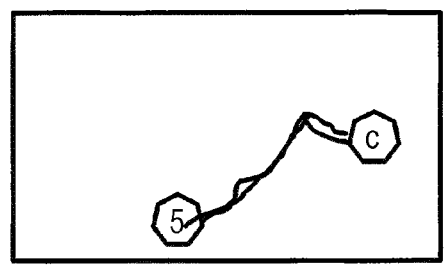

For example, as shown in FIG. 10A, the trajectories 2 and 5 and the trajectories a and c come close to each other, respectively, in a position 241 shown by a black triangle. In this case, the target moving object is likely to have switched between the moving objects 2 and 5 or between the moving objects a and c in the position 241. That is, as shown in FIGS. 10B and 10C, the possibility that trajectory pairs 2-a and 5-c may be generated also needs to be considered.

Figure 10D:
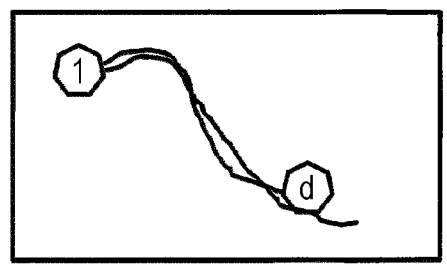

Accordingly, the trajectories 2, 5, a, and c are extracted as trajectories G. As shown in FIG. 10D, candidate pairs D obtained by excluding trajectories including the trajectory 2, 5, a, or c from the trajectory pairs C (see FIG. 9B) are only the trajectory 1-d.

In the pair extraction process described above, the trajectory pairs A to D are extracted from the multiple trajectory combinations. As described above, the candidate pairs B are trajectory combinations whose trajectories resemble each other over a relatively long period of time in the pictures, and the candidate pairs A are trajectory combinations whose trajectories resemble each other over all the pictures. The candidate pairs C are trajectory combinations where change of the target moving object is less likely to have occurred, of the candidate pairs A and B. The candidate pairs D are trajectory combinations where change of the target moving object is much less likely to have occurred, of the candidate pairs C.

As seen above, the trajectories generated in the moving-object tracking process are classified into the trajectories forming candidate pairs and the trajectories not forming candidate pairs (hereafter referred to as "the remaining trajectories"). The candidate pairs are classified into the candidate pairs D, candidate pairs C (except for the candidate pairs D), candidate pairs A (except for the candidate pairs C, D), and the candidate pairs B (except for the candidate pairs C, D). These types of candidate pairs are presented above in the descending order of the correlation between the forward trajectory and backward trajectory forming a candidate pair.

In practice, the moving-object tracking process may skip acquisition of the candidate pairs D, that is, may proceed to generation of an integrated trajectory described below after acquisition of the candidate pairs C. This is because the operator can check the start and end of the pictures and thus easily perform deletion or the like of a trajectory where change of the target moving object is found to have occurred.

In step S1800 of FIG. 3, the trajectory integration unit 160 generates integrated trajectories by integrating the forward and backward trajectories forming each trajectory pair. For example, the trajectory integration unit 160 may determine the candidate pairs C (and candidate pairs D), where the correlation between the forward and backward trajectories is relatively high, as trajectory pairs for integration. The trajectory integration unit 160 may also determine all the trajectory pairs as trajectory pairs for integration.

In the moving-object tracking process, as described above, errors can be accumulated as the process proceeds. Accordingly, it can be said that portions temporally closer to the start point, of a trajectory have higher reliability and that portions temporally distant from the start point, of a trajectory have lower reliability. Accordingly, the trajectory integration unit 160 generates integrated trajectories by assigning larger weights to portions closer to the start point, of each trajectory.

Figure 11A:
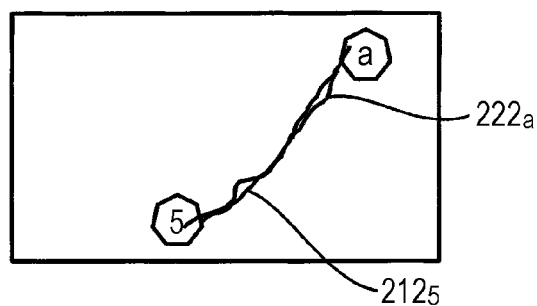
FIGS. 11A and 11B show the manner in which forward and backward trajectories are integrated according to the second embodiment.
Figure 11B:
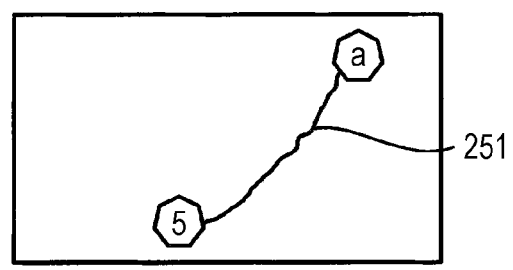

FIGS. 11A and 11B are diagrams showing the manner in which forward and backward trajectories are integrated.

For example, the trajectory integration unit 160 integrates the trajectory 5 (forward trajectory $212_5$) and the trajectory a (backward trajectory $222_a$) shown in FIG. 11A. In this case, the trajectory integration unit 160 extracts the portion corresponding to times preceding time $t_m$, of the trajectory 5 and the portion corresponding to time $t_m$ and later times, of the trajectory a. Time $t_m$ is located in the center of the time axis of the pictures. Then, as shown in FIG. 11B, the trajectory integration unit 160 generates an integrated trajectory 251 by connecting the extracted portion (former half) of the trajectory 5 and portion (latter half) of the trajectory a at time $t_m$.

The trajectory integration unit 160 can generate a smoother integrated trajectory, for example, by assigning more precise weights.

In step S1900 of FIG. 3, the result output unit 170 outputs trajectory information including the trajectories and the degrees of reliability thereof, thereby completing the process.

For example, the result output unit 170 generates a trajectory display image where the trajectories are drawn in such a manner that the degrees of reliability thereof are recognized and then outputs the image to a display device. For another example, the result output unit 170 generates a traffic line display picture where the traffic lines of moving objects which have moved along trajectories is drawn in such a manner that the degrees of reliability of the trajectories are recognized and then outputs the picture to a display device.

Figure 12A:
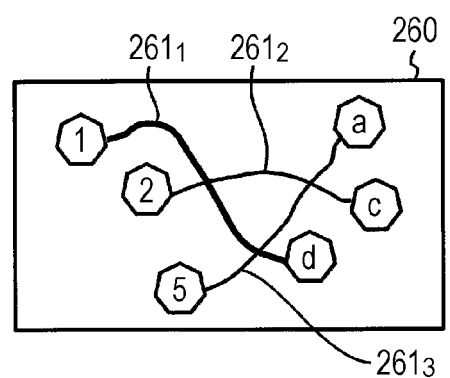
FIGS. 12A and 12B show an example of a trajectory display image or traffic line display picture according to the second embodiment.
Figure 12B:
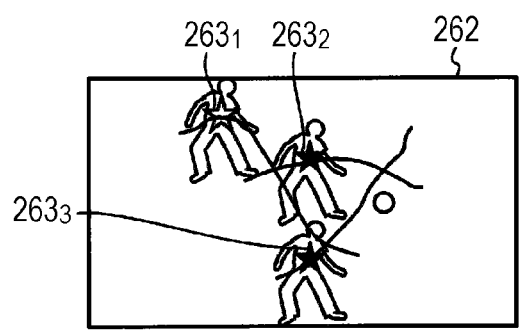

FIGS. 12A and 12B are diagrams showing an example of a trajectory display image or traffic line display picture generated by the result output unit 170.

The result output unit 170 generates, for example, a trajectory display image 260 as shown in FIG. 12A. The trajectory display image 260 includes trajectories 261 generated from trajectory pairs having high correlations. While the start points and the identifiers thereof are shown in FIG. 12A, these need not necessarily be displayed.

The integrated trajectory 1-d (trajectory $261_1$) of the trajectory pair 1-d is drawn using a thicker line than the integrated trajectory 2-c (trajectory $261_2$) of the trajectory pair 2-c or the integrated trajectory 5-a (trajectory $261_3$) of the trajectory pair 5-a. The reason is that the trajectory pair 1-d, which is a candidate pair D, has a higher reliability than the trajectory pairs 2-c, 5-a, which are candidate pairs C, and that the integrated trajectory generated from the trajectory pair having the higher reliability also has a higher reliability.

The result output unit 170 generates, for example, a traffic line display picture 262 as shown in FIG. 12B. For example, the traffic line display picture 262 is displayed in such a manner that markers $263_1$ to $263_3$ showing the positions of times during playback of the trajectories $261_1$ to $261_3$ are superimposed on the pictures being played back. The markers 263 represent the traffic lines of the moving objects.

The markers 263 move in such a manner to trace over the integrated trajectory, as the pictures proceed. If an integrated trajectory is correct, the corresponding marker 263 moves while correctly following the corresponding moving object; if an integrated trajectory is not correct, the corresponding marker 263 does not correctly follow the corresponding moving object and moves away therefrom or starts to follow another moving object. Accordingly, the user can check whether the moving objects have been tracked correctly while referring to the actual pictures.

The differences in reliability can be shown in the form of the differences in various display forms, including the thicknesses of the lines, the sizes or shapes of the markers, and the colors, luminance, flashing or not, or display timings of the lines or markers.

The result output unit 170 may also assign five-step index values V indicating the degrees of reliability of the trajectories to the integrated trajectories of the candidate pairs D, the integrated trajectories of the candidate pairs C, the integrated trajectories of the candidate pairs A, the integrated trajectories of the candidate pairs B, and the remaining trajectories. For example, V=1 indicates that the tracking was successful; V=2 indicates that the tracking is more likely to have been successful; V=3 indicates that the tracking is less likely to have been successful; V=4 indicates that the tracking is likely to have failed; and V=5 indicates that the tracking failed.

The result output unit 170 may also display an image representing an index value V in each frame in such a manner that the image is superimposed on the position of the moving object. For example, the result output unit 170 displays a circle (○) having a color corresponding to the index value V in the waist position of the moving object. Colors corresponding to the index values V=1 to 4 are, for example, blue, green, yellow, and red, respectively. Thus, the user can easily determine what degree of credit he or she can give to each of the tracking results.

<Additional Information Generation Process>

The trajectory integration unit 160 may output trajectories other than the candidate pairs C, D (hereafter referred to as "low-reliability trajectories"). The trajectory integration unit 160 may also calculate a likelihood representing the degree of correctness of the tracking result at each time (hereafter referred to as the "tracking likelihood") with respect to the low-reliability trajectories and output the low-reliability trajectories and the priorities thereof based on the tracking likelihoods (hereafter referred to as "additional information").

Figure 13:
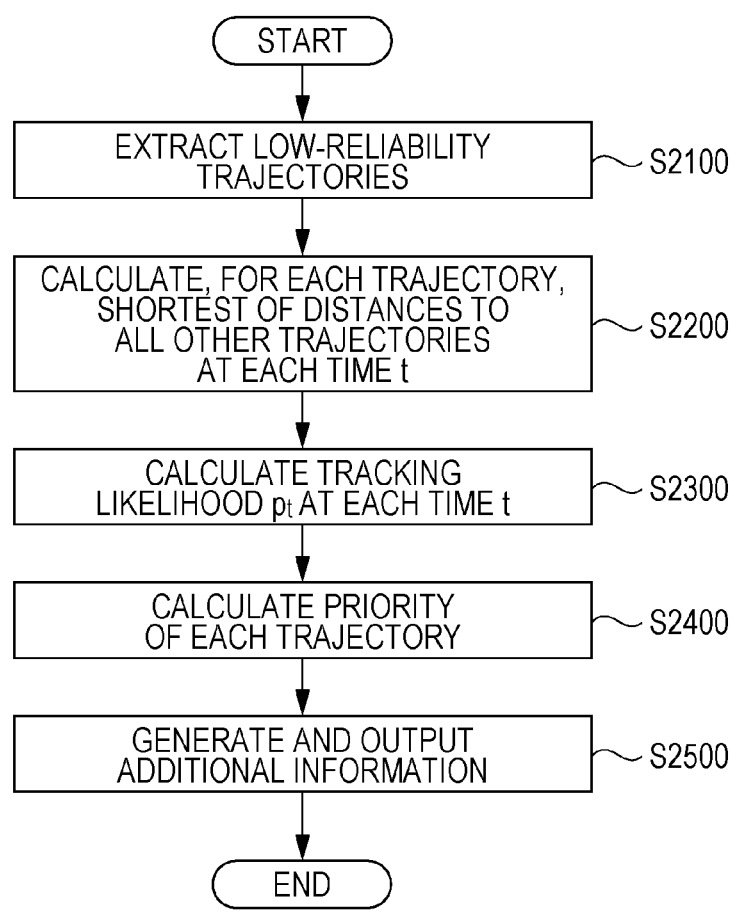
FIG. 13 shows an example of an additional information generation process according to the second embodiment.

FIG. 13 is a flowchart showing an example of an additional information generation process. The trajectory analyzing apparatus 100 performs an additional information generation process described below, for example, when the user operates the apparatus to instruct it to display additional information after step S1900 of FIG. 3. FIGS. 14A to 14F are diagrams showing an additional information generation process and an example of generated additional information.

In step S2100, the trajectory integration unit 160 extracts low-reliability trajectories.

Figure 14A:
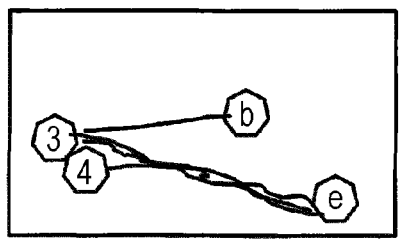
FIGS. 14A to 14F show the additional information generation process and an example of generated additional information according to the second embodiment.

For example, as shown in FIG. 14A, the trajectories 3, 4, b, and e are extracted as low-reliability trajectories.

In step S2200 of FIG. 13, the trajectory integration unit 160 calculates, for each forward trajectory, the shortest of the distances to all the other forward trajectories at each time t (hereafter referred to as "the shortest distance $d_t$").

As the shortest distance $d_t$ is shorter, other moving objects are more likely to be located at very short distances and therefore the tracking of the target moving object is more likely to have failed. Further, as the shortest distance $d_t$ is shorter, replacement of the target moving object is more likely to have occurred.

In step S2300, the trajectory integration unit 160 calculates a tracking likelihood $p_t$ on the basis of the shortest distance $d_t$.

For example, when the shortest distance $d_t$ is equal to or shorter than a sixth threshold n (positive constant), the trajectory integration unit 160 uses a value represented by Formula (1) below as the tracking likelihood $p_t$ at time t of the i-th trajectory. When the shortest distance $d_t$ exceeds the sixth threshold n, the trajectory integration unit 160 uses a value represented by Formula (2) below as the tracking likelihood $p_t$ at time t of the i-th trajectory.

$$p_t = d_t/n \text{ (if } d_t < n) \tag{1}$$

$$p_t = 1 \text{ (if } d_t \geq n) \tag{2}$$

That is, the tracking likelihood $p_t$ becomes a larger value as the shortest distance $d_t$ is longer within a certain distance; it becomes a fixed maximum value "1" at distances exceeding the certain distance.

Figure 14D:
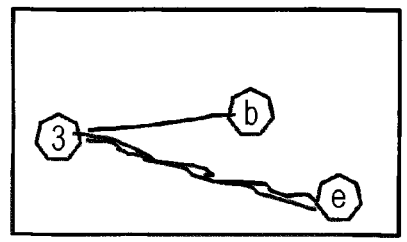
Figure 14B:
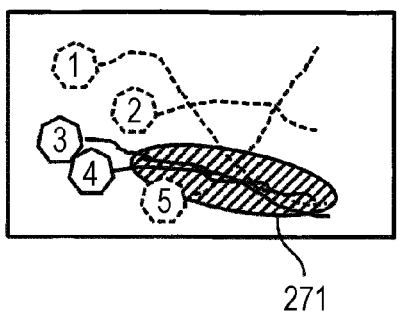

For example, as shown in FIG. 14B, the distances between the latter half of the trajectory 3 and the trajectories 1, 4, and 5 are short. Also, the distances between the latter half of the trajectory 4 and the trajectories 1, 3, and 5 are short. Accordingly, the tracking likelihoods $p_t$ of the trajectories 3, 4 take low values in a region 271 shown by diagonal lines.

Figure 14E:
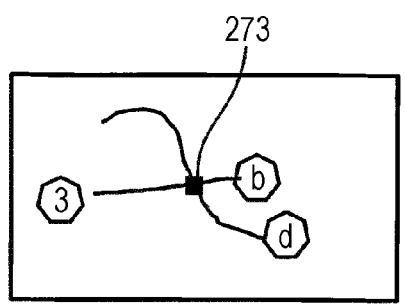
Figure 14C:
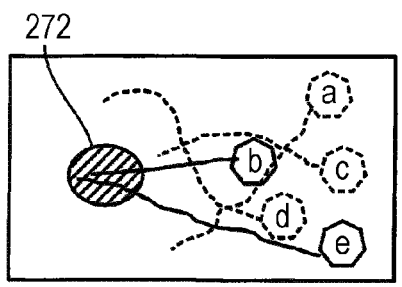

Also, as shown in FIG. 14C, the distance between the latter halves of the trajectories b and e is short. Accordingly, the tracking likelihoods $p_t$ of the trajectories b, e take low values in a region 272 shown by diagonal lines.

In step S2400 of FIG. 13, the trajectory integration unit 160 determines the priority of each low-reliability trajectory on the basis of the calculated tracking likelihoods $p_t$ at the respective times. As used herein, the priority refers to an index value which becomes lower as the corresponding reliability is lower and, for example, corresponds to the priority with which the trajectory is presented to the user.

In step S2400, the trajectory integration unit 160 calculates the priority of each trajectory using the tracking likelihoods $p_t$ calculated in step S2300. For example, the trajectory integration unit 160 assigns higher priorities to trajectories having larger sums S of the tracking likelihoods $p_t$ over all the pictures (hereafter referred to as "tracking likelihood sums").

For example, of the tracking likelihood sums S of the trajectories 3, b, and e shown in FIG. 14D, that of the trajectory b is largest; that of the trajectory e is second largest; and that of the trajectory 3 is smallest.

The trajectory integration unit 160 may assign higher priorities to trajectories not including the start point included in both the candidate pairs A and B or trajectories having smaller shortest distances $d_t$ at the start point, of multiple trajectories having equal tracking likelihood sums S.

The trajectory integration unit 160 may also generate a new candidate trajectory from each start point on the basis of trajectory information.

Figure 14F:
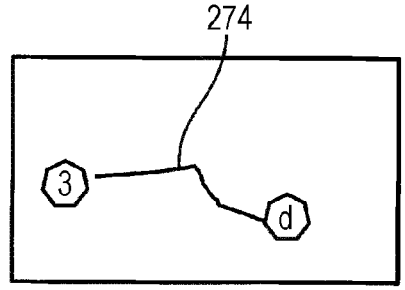

For example, as shown in FIG. 14E, the trajectory b is close to the trajectory d in a position 273 shown by a rhombus. In this case, as shown in FIG. 10, replacement of the target moving object is likely to have occurred. For this reason, for example, as shown in FIG. 14F, the trajectory integration unit 160 generates a new trajectory 274 by connecting the latter half of the trajectory b and the former half of the trajectory d.

The trajectory integration unit 160 may assign, to the newly generated trajectory 274, a lower priority than that of the trajectory e. The trajectory integration unit 160 may also calculate the tracking likelihood sum S of the trajectory 274 and then reassign priorities to the trajectories 3, b, e, and 274 so that trajectories having larger tracking likelihood sums S have higher priorities.

In step S2500, the trajectory integration unit 160 generates additional information by associating the low-reliability trajectories (including those newly generated) with the priorities thereof. The result output unit 170 then outputs the generated additional information, for example, to a display device, thereby ending the process.

For example, the result output unit 170 generates an image (picture) representing information indicating the trajectories and the priorities thereof which is similar to the trajectory display image 260 or traffic line display picture 262 shown in FIG. 12A or 12B and then causes the display device to display the image. For another example, upon receipt of a user operation, the result output unit 170 causes the display device to sequentially display images (pictures) representing information indicating a trajectory and the priority thereof in the descending order of priority.

The result output unit 170 may display portions of a trajectory in such a manner that the portions are associated with the tracking likelihoods $p_t$ at the respective times. For example, the result output unit 170 displays the portions of the trajectory using lines having thicknesses which are inversely proportionate to the tracking likelihoods $p_t$. A trajectory drawn using a thicker line indicates that the tracking of the target moving object is more likely to have failed. Accordingly, the user can intuitively grasp the degrees of tracking failure possibility of the portions of the trajectory, that is, the degrees of reliability of the portions.

The result output unit 170 may generate and store additional information in step S2500. For example, the stored additional information can be read and outputted later.

Through the above additional information generation process, the trajectory analyzing apparatus 100 can output the low-reliability trajectories along with information corresponding to the degrees of reliability thereof, that is, can output additional information having high significance as a result of the moving-object tracking process.

The trajectory analyzing apparatus 100 may also calculate the tracking likelihoods $p_t$ with respect to the trajectories forming candidate pairs C, D or integrated trajectories and output information where the trajectories and tracking likelihoods $p_t$ are associated with each other.

The differences in tracking likelihood $p_t$ can be shown in the form of the differences in various display forms, including the thicknesses of the lines, the sizes of the markers, and the colors, luminance, flashing or not, or display timings of the lines or markers.

Through the above operation, the trajectory analyzing apparatus 100 can extract trajectory pairs and determine the probability (reliability) of each trajectory pair on the basis of the distance between the trajectories at each time. Thus, the trajectory analyzing apparatus 100 can reduce the possibility of tracking a wrong moving object and improve the determination accuracy of the probabilities of the trajectories.

Further, the trajectory analyzing apparatus 100 can output trajectory information including the determination result of the probability of each trajectory pair. Thus, the trajectory analyzing apparatus 100 can output information having high significance, that is, the trajectories and the degrees of reliability thereof as a result of the moving-object tracking even when the tracking accuracy is low.

The first to fifth thresholds may be values predetermined through an experiment or the like or may be values which can be changed by a user operation or the like.

For example, the first to third and fifth thresholds may be adjusted according to (e.g., in proportion to) the size of the target moving object. The fourth threshold may be adjusted according to (e.g., in proportion to) the speed or movement of the target moving object. Further, the thresholds may be set to a little too strict values in accordance with the preferences of the user (so that trajectory pairs having higher degrees of reliability are extracted). Further, the thresholds may be set according to the proficiency of the user, who checks the result of the moving-object tracking process. For example, the fifth threshold may be set to a little too loose (a little too large) value so that many candidate trajectories are presented to beginners, who have difficulty in modifying trajectories manually.

Steps S1200 and S1300, steps S1400 and S1500, and steps S1300 and S1400 are performed in inverse order, respectively. Further, if the differences in reliability between the candidate pairs C and candidate pairs D are not outputted, steps S1740 and S1750 may be omitted.

Effects of Present Embodiment

As described above, the trajectory analyzing apparatus 100 according to the present embodiment can calculate the correlation between the forward trajectory and backward trajectory and output trajectory information indicating the trajectories and the degrees of reliability based on the correlations. That is, the trajectory analyzing apparatus 100 can output information having high significance, that is, the trajectories and the degrees of reliability thereof as a result of the moving-object tracking process even when the tracking accuracy is low.

Further, the trajectory analyzing apparatus 100 according to the present embodiment displays the information using an image, for example, displays the image in such a manner that the image is superimposed on a picture. Thus, the user can more efficiently check the appropriateness of the trajectories obtained as a result of the moving-object tracking process.

Further, the trajectory analyzing apparatus 100 according to the present embodiment preferentially selects trajectories having higher degrees of reliability as trajectories to be outputted and thus can output the more accurate trajectories.

<Other Moving Objects to be Tracked>

The moving objects tracked by the trajectory analyzing apparatus 100 are not limited to the soccer players described above and may be various types of moving objects, including players of other sports, racing cars, factory workers, and animals. Further, the trajectory analyzing apparatus 100 need not necessarily track moving objects and may acquire forward and backward trajectories from another apparatus.

Other Exemplary Embodiments

The aforementioned exemplary embodiments may be configured by software as well as by hardware.

Each function block employed in the description of the aforementioned embodiments may be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

A trajectory analyzing apparatus of the present disclosure includes a matching unit that calculates a correlation between a forward trajectory obtained by tracking a moving object over pictures along a forward direction of a time axis and a backward trajectory obtained by tracking a moving object over the pictures along a backward direction of the time axis and a result output unit that outputs trajectory information indicating at least one of the forward trajectory, the backward trajectory, and an integrated trajectory obtained by integrating the forward trajectory and backward trajectory and indicating the degree of reliability of the at least one trajectory based on the calculated correlation.

The trajectory analyzing apparatus may further include a distance calculation unit that calculates a distance between the forward trajectory and backward trajectory at each time on the time axis. The degree of correlation may be higher as the calculated distance is shorter.

The trajectory analyzing apparatus may further include a picture receiving unit that receives the pictures, a start position setting unit that sets a forward start point and a backward start point to the pictures, the forward start point being a start position of the forward trajectory, the backward start point being a start position of the backward trajectory, a tracking unit that tracks a moving object located in the forward start point to generate the forward trajectory and tracks a moving object located in the backward start point to generate the backward trajectory, and a trajectory integration unit that integrates the forward trajectory and backward trajectory to generate the integrated trajectory.

The trajectory analyzing apparatus may further include a trajectory integration unit that integrates the forward trajectory and backward trajectory to generate the integrated trajectory. If at least one of the forward trajectory and backward trajectory includes multiple trajectories, the matching unit may determine a pair of the forward trajectory and the backward trajectory which are more likely to have been generated with respect to the same moving object, on the basis of the correlation. The trajectory integration unit may integrate the determined pair of forward trajectory and backward trajectory to generate the integrated trajectory.

The trajectory analyzing apparatus may further include a distance calculation unit that calculates a distance between the forward trajectory and backward trajectory at each time on the time axis. If at least one of the forward trajectory and backward trajectory includes multiple trajectories, the matching unit may determine, as a first pair, the forward trajectory and backward trajectory whose sum of the distances at the respective times on the time axis is equal to or smaller than a first threshold. The matching unit may determine, as a second pair having the lower correlation than the first pair, the forward trajectory and backward trajectory which are other than the first pair and where a time at which the distance is equal to or shorter than a third threshold is successive over a time period equal to or longer than a fourth threshold on the time axis. The matching unit may determine, as a third pair having the higher correlation than the second pair, a pair obtained by excluding, from the first and second pairs, a pair including the forward trajectory or backward trajectory included in both the first pair and second pair. The matching unit may set the correlation lower than the correlation of the second pair to the at least one trajectory which is not included in any of the first to third pairs. The result output unit may output the trajectory information indicating a difference in the reliability between the multiple trajectories based on the correlation.

In the trajectory analyzing apparatus, the matching unit may determine, as a fourth pair having the higher correlation than the correlation of the third pair, a pair obtained by excluding, from the third pair, a pair including the forward trajectory or backward trajectory whose distance to the other at least one trajectory is a fifth threshold or shorter at a certain time on the time axis, of the multiple forward trajectories or multiple backward trajectories.

In the trajectory analyzing apparatus, the result output unit may generate an image indicating the at least one trajectory as the trajectory information. In the image, a difference in the reliability between the multiple trajectories may be shown in the form of a difference in display form between the trajectories.

The trajectory analyzing apparatus may further include a trajectory integration unit that integrates the forward trajectory and backward trajectory to generate the integrated trajectory. The trajectory integration unit may generate the integrated trajectory by assigning higher weights to portions closer to a start point, of the forward trajectory and portions closer to a start point, of the backward trajectory.

The trajectory analyzing apparatus may further include a trajectory integration unit that calculates tracking likelihoods of portions of the at least one trajectory on the basis of a distance between the forward trajectories at each time or a distance between the backward trajectories at each time. The result output unit may output information about the calculated tracking likelihoods.

A method for analyzing a trajectory of the present disclosure includes calculating a correlation between a forward trajectory obtained by tracking a moving object over pictures along a forward direction of a time axis and a backward trajectory obtained by tracking a moving object over the pictures along a backward direction of the time axis and outputting trajectory information indicating one or more of the forward trajectory, the backward trajectory, and an integrated trajectory obtained by integrating the forward trajectory and backward trajectory and indicating the degree of reliability of the at least one trajectory based on the calculated correlation.

A non-transitory computer-readable medium of the present disclosure whose contents cause a computer to perform a process. The process includes calculating a correlation between a forward trajectory obtained by tracking a moving object over pictures along a forward direction of a time axis and a backward trajectory obtained by tracking a moving object over the pictures along a backward direction of the time axis and outputting trajectory information indicating at least one of the forward trajectory, the backward trajectory, and an integrated trajectory obtained by integrating the forward trajectory and backward trajectory and indicating the degree of reliability of the at least one trajectory based on the calculated correlation.

The present disclosure is useful as a trajectory analyzing apparatus and method which can output information having high significance as a result of a moving-object tracking process even when the tracking accuracy is low.

What is claimed is:

1. A trajectory analyzing apparatus comprising:
   a matching unit that calculates a correlation between a forward trajectory obtained by tracking a moving object over pictures, between a start picture and an end picture, along a forward direction of a time axis and a backward trajectory obtained by tracking a moving object over the pictures along a backward direction of the time axis; and
   a result output unit that outputs trajectory information indicating at least one of the forward trajectory, the backward trajectory and an integrated trajectory obtained by integrating the forward trajectory and backward trajectory, and indicating a degree of reliability of the at least one trajectory based on the calculated correlation.

2. The trajectory analyzing apparatus according to claim 1, further comprising a distance calculation unit that calculates a distance between the forward trajectory and backward trajectory at each time on the time axis, wherein
   the correlation is higher when the calculated distance is shorter.

3. The trajectory analyzing apparatus according to claim 2, further comprising:
   a picture receiving unit that receives the pictures;
   a start position setting unit that sets a forward start point on the start picture and a backward start point on the end picture, the forward start point being a start position of the forward trajectory, the backward start point being a start position of the backward trajectory;
   a tracking unit that tracks a moving object located in the forward start point to generate the forward trajectory and tracks a moving object located in the backward start point to generate the backward trajectory; and
   a trajectory integration unit that integrates the forward trajectory and backward trajectory to generate the integrated trajectory.

4. The trajectory analyzing apparatus according to claim 1, further comprising a trajectory integration unit that integrates the forward trajectory and backward trajectory to generate the integrated trajectory,
   wherein if at least one of the forward trajectory and backward trajectory comprises a plurality of trajectories, the matching unit determines a pair of the forward trajectory and backward trajectory which are more likely to have been generated with respect to the same moving object, on the basis of the correlation, and
   wherein the trajectory integration unit integrates the determined pair of forward trajectory and backward trajectory to generate the integrated trajectory.

5. The trajectory analyzing apparatus according to claim 1, further comprising a distance calculation unit that calculates a distance between the forward trajectory and backward trajectory at each time on the time axis, wherein if at least one of the forward trajectory and backward trajectory comprises a plurality of trajectories, the matching unit determines, as a first pair, a pair of the forward trajectory and backward trajectory whose sum of the distances at the respective times on the time axis is equal to or smaller than a first threshold, wherein the matching unit determines, as a second pair having a lower correlation than the first pair, a pair of the forward trajectory and backward trajectory which is obtained from other than the first pair, wherein a time at which the distance of the forward trajectory and backward trajectory is equal to or shorter than a third threshold is continuous over a time period which is equal to or longer than a fourth threshold on the time axis, wherein the matching unit determines, as a third pair having a higher correlation than the second pair, a pair obtained from the first and second pairs, by excluding a pair whose forward trajectory or backward trajectory are included in both the first pair and second pair, and wherein the matching unit sets the correlation lower than the correlation of the second pair to a trajectory which is not included in any of the first to third pairs, and wherein the result output unit outputs the trajectory information indicating a difference in the reliability between the plurality of trajectories based on the correlation.

6. The trajectory analyzing apparatus according to claim 5, wherein the matching unit determines, as a fourth pair having a higher correlation than the correlation of the third pair, a pair obtained from the third pair, by excluding a pair including the forward trajectory or backward trajectory whose distance to the other same directional trajectory is equal to or shorter than a fifth threshold at a certain time on the time axis.

7. The trajectory analyzing apparatus according to claim 1, wherein the result output unit generates an image indicating the at least one trajectory as the trajectory information, and wherein, in the image, a difference in the reliability between the plurality of trajectories is shown in the form of a difference in display form between the trajectories.

8. The trajectory analyzing apparatus according to claim 7, wherein the result output unit generates the difference in display form, in the image, including at least one of a thickness of a line, a size or a shape of a marker, and a color, luminance, flashing or not, or a display timing of a line or a marker.

9. The trajectory analyzing apparatus according to claim 1, further comprising a trajectory integration unit that integrates the forward trajectory and backward trajectory to generate the integrated trajectory, wherein the trajectory integration unit generates the integrated trajectory by assigning higher weights to portions closer to a start point, of the forward trajectory and portions closer to a start point, of the backward trajectory.

10. The trajectory analyzing apparatus according to claim 1, further comprising a trajectory integration unit that calculates tracking likelihoods of portions of the at least one trajectory on the basis of a distance between the forward trajectories at each time or a distance between the backward trajectories at each time, wherein the result output unit outputs information about the calculated tracking likelihoods.

11. A method for analyzing a trajectory, comprising:

calculating a correlation between a forward trajectory obtained by tracking a moving object over pictures, between a start picture and an end picture, along a forward direction of a time axis and a backward trajectory obtained by tracking a moving object over the pictures along a backward direction of the time axis; and outputting trajectory information indicating at least one of the forward trajectory, the backward trajectory and an integrated trajectory obtained by integrating the forward trajectory and backward trajectory, and indicating a degree of reliability of the at least one trajectory based on the calculated correlation.

12. A non-transitory computer-readable medium whose contents cause a computer to perform a process, the process comprising:

calculating a correlation between a forward trajectory obtained by tracking a moving object over pictures, between a start picture and an end picture, along a forward direction of a time axis and a backward trajectory obtained by tracking a moving object over the pictures along a backward direction of the time axis; and outputting trajectory information indicating at least one of the forward trajectory, the backward trajectory, and an integrated trajectory obtained by integrating the forward trajectory and backward trajectory and indicating a degree of reliability of the at least one trajectory based on the calculated correlation.

13. The method according to claim 11, further comprising:

calculating a distance between the forward trajectory and backward trajectory at each time on the time axis, wherein if at least one of the forward trajectory and backward trajectory comprises a plurality of trajectories, a pair of the forward trajectory and backward trajectory, whose sum of the distances at the respective times on the time axis is equal to or smaller than a first threshold, is determined as a first pair, wherein a pair of the forward trajectory and backward trajectory, which is obtained from other than the first pair, is determined as second pair having a lower correlation than the first pair, wherein a time at which the distance of the forward trajectory and backward trajectory is equal to or shorter than a third threshold is continuous over a time period which is equal to or longer than a fourth threshold on the time axis, wherein a pair obtained from the first and second pairs is determined, as a third pair having a higher correlation than the second pair, by excluding a pair whose forward trajectory or backward trajectory are included in both the first pair and second pair, and wherein the correlation lower than the correlation of the second pair is set to a trajectory which is not included in any of the first to third pairs, and wherein the trajectory information indicating a difference in the reliability between the plurality of trajectories based on the correlation is output.

14. The method according to claim 13, wherein a pair obtained from the third pair is determined, as a fourth pair having a higher correlation than the correlation of the third pair, by excluding a pair including the forward trajectory or backward trajectory whose distance to the other same directional trajectory is equal to or shorter than a fifth threshold at a certain time on the time axis.

15. The non-transitory computer-readable medium according to claim 12, wherein the process further comprises:
calculating a distance between the forward trajectory and backward trajectory at each time on the time axis,
wherein if at least one of the forward trajectory and backward trajectory comprises a plurality of trajectories, a pair of the forward trajectory and backward trajectory, whose sum of the distances at the respective times on the time axis is equal to or smaller than a first threshold, is determined as a first pair,
wherein a pair of the forward trajectory and backward trajectory, which is obtained from other than the first pair, is determined as second pair having a lower correlation than the first pair, wherein a time at which the distance of the forward trajectory and backward trajectory is equal to or shorter than a third threshold is continuous over a time period which is equal to or longer than a fourth threshold on the time axis,
wherein a pair obtained from the first and second pairs is determined, as a third pair having a higher correlation than the second pair, by excluding a pair whose forward trajectory or backward trajectory are included in both the first pair and second pair, and
wherein the correlation lower than the correlation of the second pair is set to a trajectory which is not included in any of the first to third pairs, and
wherein the trajectory information indicating a difference in the reliability between the plurality of trajectories based on the correlation is output.

16. The non-transitory computer-readable medium according to claim 15, wherein a pair obtained from the third pair is determined, as a fourth pair having a higher correlation than the correlation of the third pair, by excluding a pair including the forward trajectory or backward trajectory whose distance to the other same directional trajectory is equal to or shorter than a fifth threshold at a certain time on the time axis.

* * * * *